US012714992B2

(12) United States Patent
Veldt et al.

(10) Patent No.: US 12,714,992 B2
(45) Date of Patent: Aug. 25, 2026

(54) CAROUSEL ASSEMBLY FOR UNIVERSAL ACCESS PORT

(71) Applicant: Venturedyne, Ltd., Pewaukee, WI (US)

(72) Inventors: Andrew Veldt, Saugatuck, MI (US); Richard Walker, Grandville, WI (US)

(73) Assignee: Venturedyne, Ltd., Pewaukee, WI (US)

( * ) Notice: Subject to any disclaimer, the term of this patent is extended or adjusted under 35 U.S.C. 154(b) by 539 days.

(21) Appl. No.: 18/324,470

(22) Filed: May 26, 2023

(65) Prior Publication Data

US 2024/0390884 A1 Nov. 28, 2024

(51) Int. Cl.
*B01L 1/02* (2006.01)

(52) U.S. Cl.
CPC ....... *B01L 1/025* (2013.01); *B01L 2300/0609* (2013.01); *B01L 2300/1838* (2013.01)

(58) Field of Classification Search
USPC ........................................................ 73/863.11
See application file for complete search history.

(56) References Cited

U.S. PATENT DOCUMENTS 4,476,733 A * 10/1984 Chlosta .................. G01N 30/12 422/65
4,854,726 A * 8/1989 Lesley .................. G01N 17/00 374/45
4,949,031 A 8/1990 Szasz et al.
5,147,136 A 9/1992 Hartley et al.
6,976,340 B2 * 12/2005 Schulze ................. G01D 11/24 414/217
7,252,586 B2 * 8/2007 Schulze ................. G01D 11/24 49/463

* cited by examiner

*Primary Examiner* — Walter L Lindsay, Jr.
*Assistant Examiner* — Warren K Fenwick
(74) *Attorney, Agent, or Firm* — Boyle Fredrickson, S.C.

(57) ABSTRACT

A carousel assembly is designed to fit into a universal access port of a conditioning enclosure and includes a frame and a panel. The panel is pivotable between a first position, in which a first specimen location is inside the conditioning space and a second specimen location is outside the conditioning space, and a second position, in which the second specimen location is inside the conditioning space and the first specimen location is outside the conditioning space. A sealing door is movable between an open position that permits rotation of the panel and a closed position that blocks rotation of the panel. Preferably, one of the first and second specimen locations is accessible from outside the conditioning enclosure when the sealing door is in the closed position. The carousel assembly can be used to perform a method of conducting environmental testing on a first test specimen and a second test specimen.

19 Claims, 8 Drawing Sheets

Fig. 12
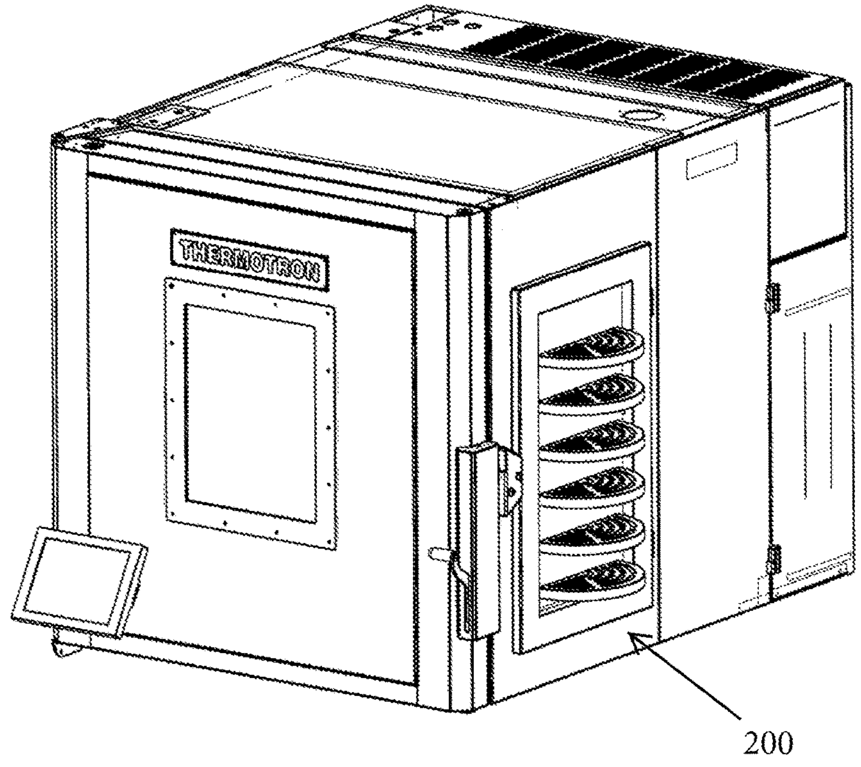
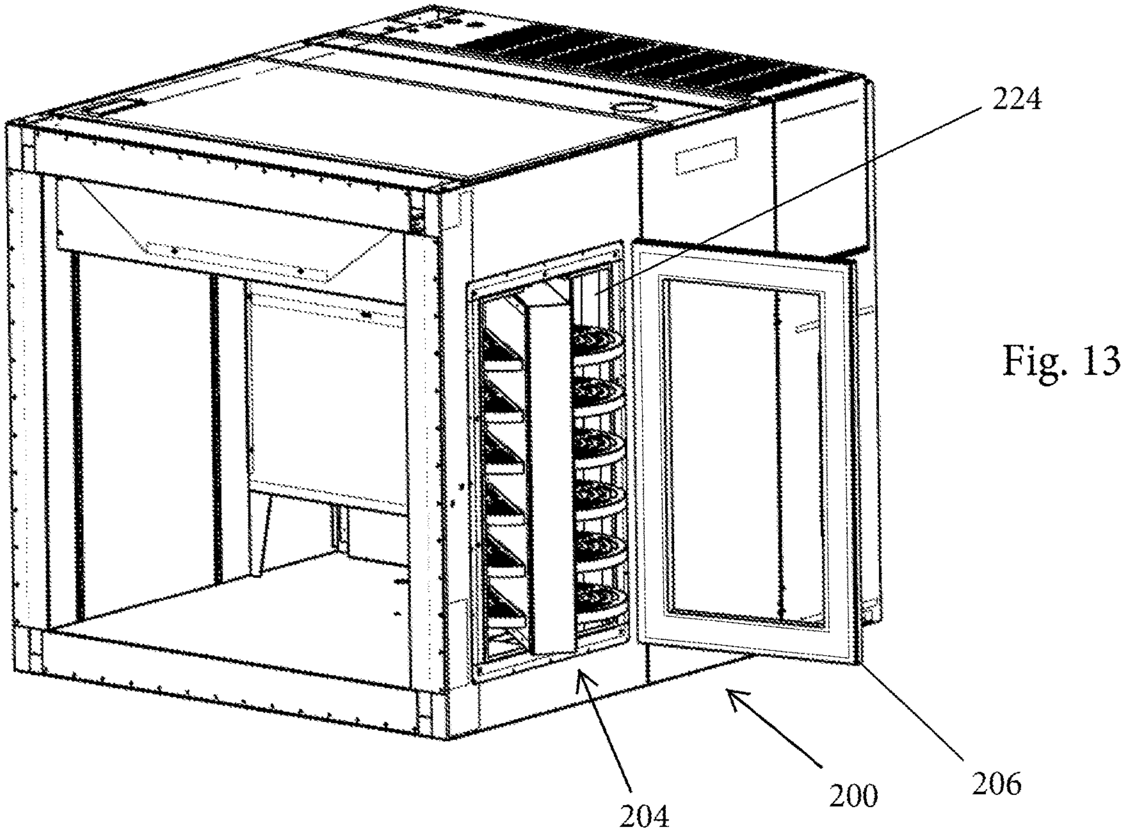
Fig. 13

CAROUSEL ASSEMBLY FOR UNIVERSAL ACCESS PORT

FIELD OF THE INVENTION

The present invention relates to conditioning enclosures and more specifically to assemblies for insertion into a universal access port for conditioning enclosures.

BACKGROUND

There are several conditioning enclosures on the market, which disclose an opening created in a side thereof. A conditioning enclosure is defined as an oven, freezer, incubator, burn-in chamber, environmental test chamber, shaker, or any other device that stresses, modifies, or conditions an item inserted therein. U.S. Pat. No. 4,854,726 to Lesley et al. discloses a thermal stress screening system. An exposure chamber is connected to a cabinet with a pair of insulated delivery hoses. U.S. Pat. No. 4,949,031 to Szasz et al. discloses an environmental stress screening apparatus for electronic products. A product carrier pallet is inserted into an opening formed in an environmental test chamber. U.S. Pat. No. 5,147,136 to Hartley et al. discloses a temperature cycling test chambers. A portion of the wall is rotatable between two different test chambers.

U.S. Pat. No. 6,976,340 discloses a universal access port formed through a wall of a conditioning enclosure and located at a specific distance from a floor or mounting surface. The opening is preferably rectangular in shape, but other shapes may also be used. When not in use, the universal access port is covered with a sealing panel. Insertable devices may be efficiently inserted and removed from the universal access port. A perimeter of the insertable device is sized to be inserted into the universal access port. Each insertable device preferably seals with an exterior and interior wall of the conditioning enclosure.

SUMMARY

This present disclosure provides a carousel assembly designed to fit into a universal access port of a conditioning enclosure for performing environmental testing. The conditioning enclosure comprises a housing defining a conditioning space and including a front wall having an access port. The carousel assembly includes a frame removably positioned in the access port and a panel pivotally coupled to the frame. The panel defines a first specimen location on a first side of the panel and a second specimen location on a second side of the panel opposite the first side. The panel is pivotable between a first position, in which the first specimen location is inside the conditioning space and the second specimen location is outside the conditioning space, and a second position, in which the second specimen location is inside the conditioning space and the first specimen location is outside the conditioning space.

In one embodiment, the panel is substantially aligned with the front wall of the housing when the panel is in first position and when the panel is in the second position. The carousel assembly can further include a panel seal between the frame and the panel when the panel is in the first position and when the panel is in the second position.

The conditioning enclosure can further include a sealing door mounted to the frame and movable between an open position that permits rotation of the panel and a closed position that blocks rotation of the panel. The sealing door advantageously provides a seal between the frame and the panel when the sealing door is in the closed position. Preferably, one of the first specimen location and the second specimen location is accessible from outside the conditioning enclosure when the sealing door is in the closed position.

The first specimen location can be defined by a first shelf mounted on a first side of the panel, and the second specimen location can be defined by a second shelf mounted on a second side of the panel. Preferably, one of the first shelf and second shelf extends through an opening in the sealing door when the sealing door is in the closed position.

The above-described carousel assembly can be used to perform a method of conducting environmental testing on a first test specimen and a second test specimen. The method comprises inserting the carousel assembly into the access port, loading the first test specimen to the first specimen location while the first specimen location is outside the conditioning space, and rotating the panel a first time (e.g., about 180 degrees) until the first specimen is inside the conditioning space while simultaneously positioning the second specimen location outside the conditioning space. A first test is then performed on the first specimen while the first specimen is inside the conditioning space and while the second specimen location is outside the conditioning space. A second specimen is then loaded to the second specimen location while the second specimen location is outside the conditioning space and also while the first specimen location is inside the conditioning space. The method further includes rotating the panel a second time until the second specimen is inside the conditioning space while simultaneously positioning the first specimen outside the conditioning space, and after rotating the panel a second time, performing a second test (e.g., following substantially the same protocol as the first test) on the second specimen.

In one embodiment, before rotating the panel a first time, the method further includes moving the sealing door from a closed position that blocks rotation of the panel to an open position that permits rotation of the panel. After rotating the panel a first time, the method can further include moving the sealing door from the open position to the closed position to provide a seal between the frame and the panel. Preferably, the first specimen location is defined by a first shelf mounted on a first side of the panel and the second specimen location is defined by a second shelf mounted on a second side of the panel, and after moving the sealing door from the open position to the closed position the second shelf extends through an opening in the sealing door.

Other aspects of the disclosure will become apparent by consideration of the detailed description and the accompanying drawings.

BRIEF DESCRIPTION OF THE DRAWINGS

FIG. 12 is perspective view of a conditioning enclosure having a universal access port and a carousel assembly positioned in the port with a sealing door in a closed position.

FIG. 13 is the perspective view of FIG. 12 with the sealing door in an open position.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
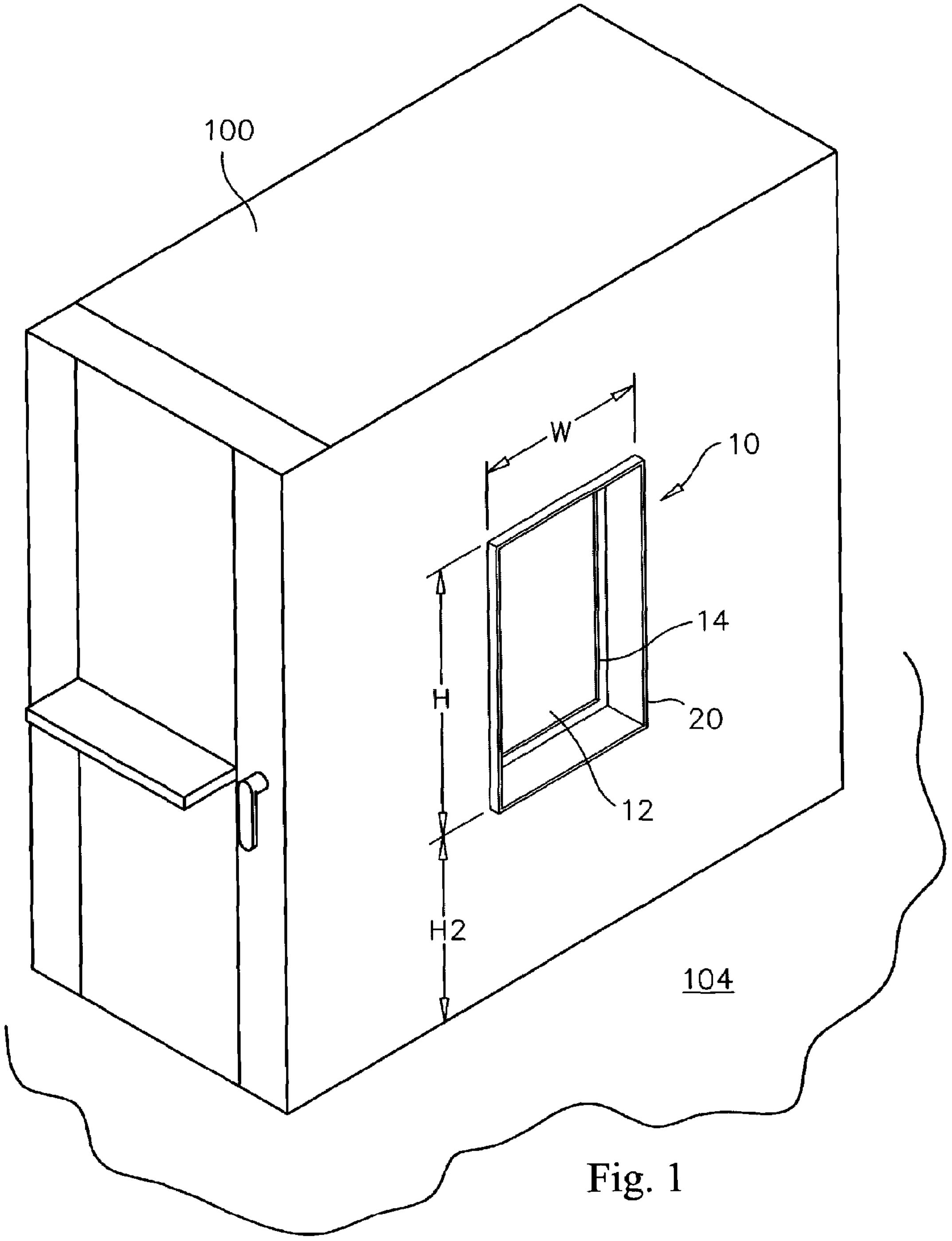
FIG. 1 is a perspective view of a conditioning enclosure with a universal access port in accordance with the present invention.
Figure 3:
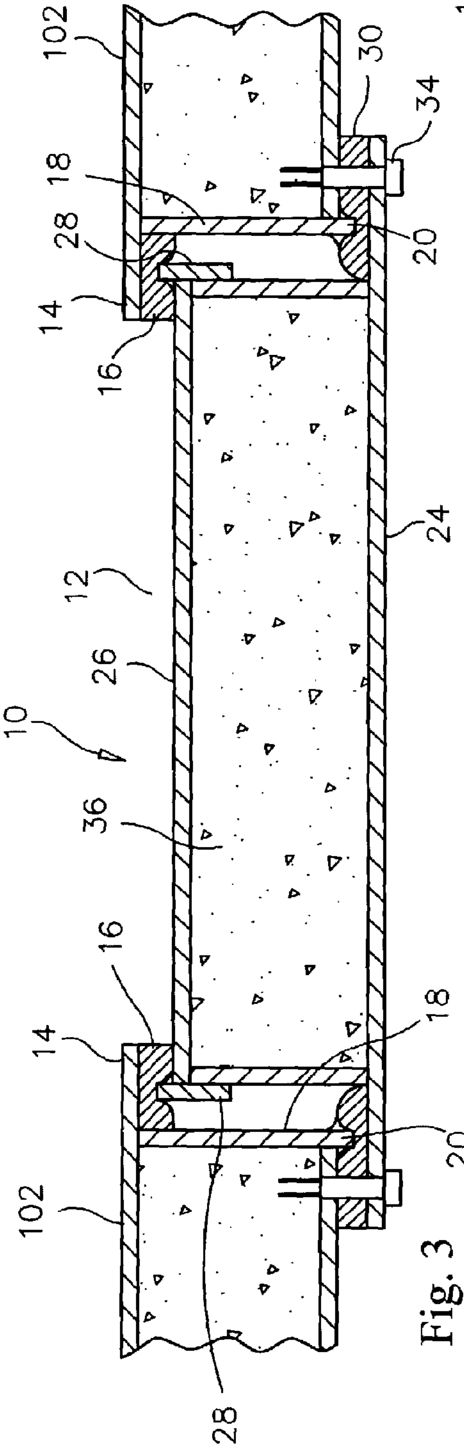
FIG. 3 is a cross sectional view of a sealing panel attached to a universal access port of a conditioning enclosure in accordance with the present invention.

With reference now to the drawings, and particularly to FIG. 1, there is shown a perspective view of a conditioning enclosure 100 with a universal access port 10. With reference to FIG. 3, the universal access port 10 preferably includes an opening 12 of a specific width "W" and height "H" formed through a wall 102 of the conditioning enclosure 100. The universal access port 10 is disclosed as having a rectangular shape, but other shapes may also be used. Preferably, an interior peripheral flange 14 extends from an interior wall 102. The interior peripheral flange 14 surrounds the perimeter of the opening 12. A perimeter sealing gasket 16 is attached to the interior peripheral flange 14. Preferably, a perimeter sealing ridge 20 extends from a peripheral wall 18 of the opening 12. A bottom of the opening 12 is located at a height "H2" from a floor or mounting surface 104 of the conditioning enclosure 100.

Figure 2:
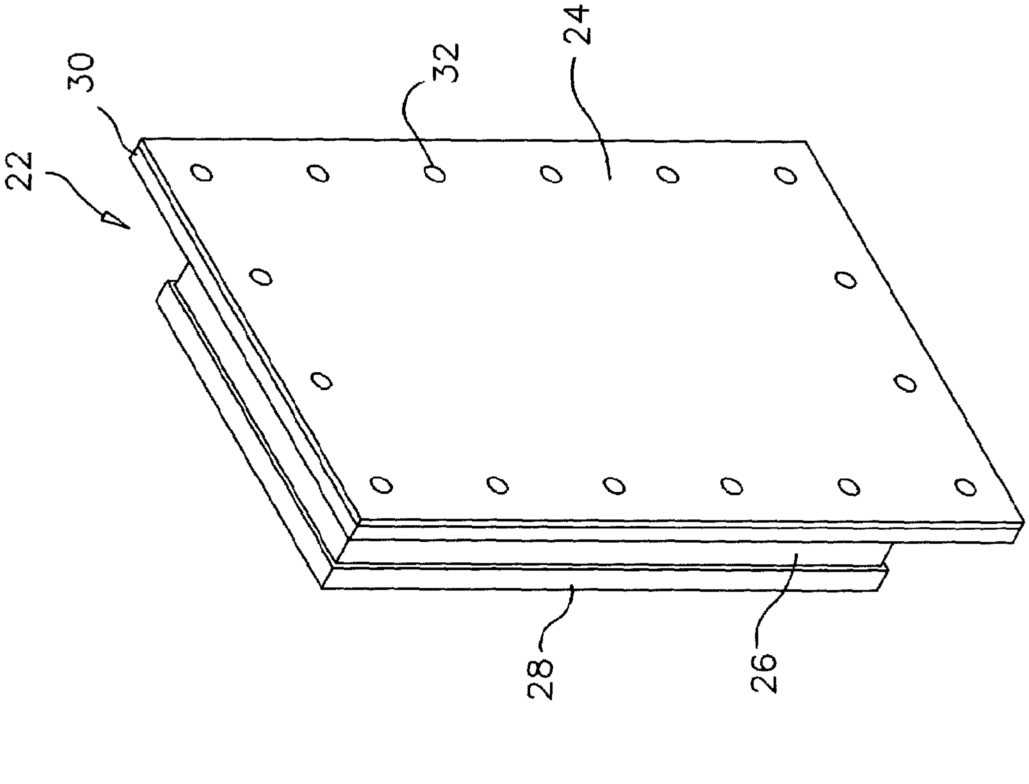
FIG. 2 is a perspective view of a sealing panel for insertion into a universal access port of a conditioning enclosure in accordance with the present invention.

With reference to FIG. 2, when not in use, the universal access port 10 is covered with a sealing panel 22. The sealing panel 22 preferably includes a mounting plate 24, an insulated insert 26, a panel perimeter sealing ridge 28, and a panel perimeter sealing gasket 30. A plurality of mounting holes 32 are formed near the perimeter of the mounting plate 24. A plurality of fasteners 34 are inserted through the plurality of mounting holes 32 to retain the sealing panel 22 in the universal access port 10. The insulated insert 26 extends form a back of the mounting plate 24. The insulated insert 26 preferably contains an equivalent amount of insulation 36 found in the walls 102 of the conditioning enclosure 100. The panel perimeter sealing ridge 28 is attached to a perimeter of the insulated insert 26. The panel perimeter sealing ridge 28 seals against the perimeter sealing gasket 16 and the perimeter sealing ridge 20 seals against the panel perimeter sealing gasket 30. One method of sealing the sealing panel 22 (and other insertable devices) to the universal access port 10 is disclosed; however other methods of sealing may also be used.

Figure 4:
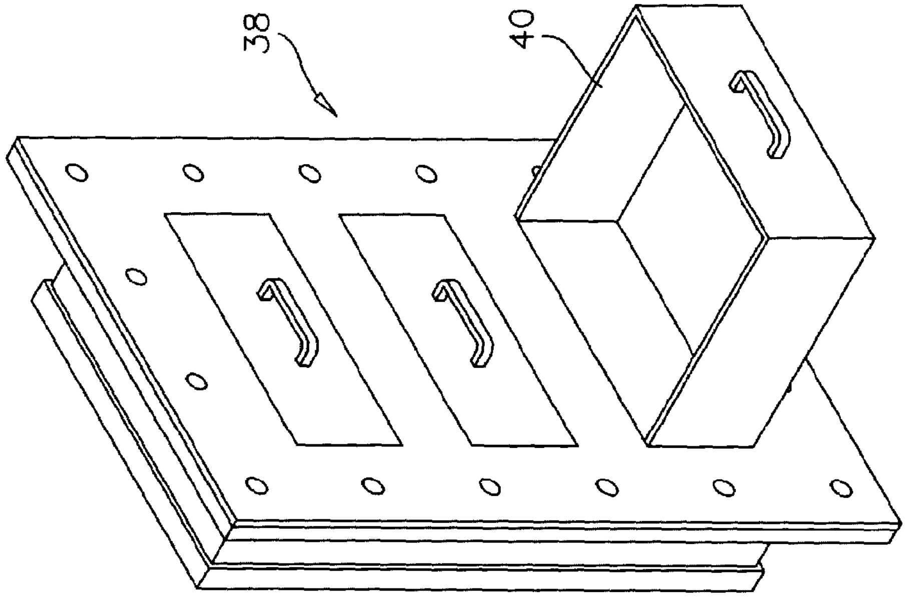
FIG. 4 is a perspective view of a drawer device for insertion into a universal access port of a conditioning enclosure in accordance with the present invention.

FIGS. 4-7 disclose sealing panels which have been modified to form insertable devices. FIG. 4 discloses a drawer device 38. A plurality of drawers 40 are slidably retained in the drawer device 38. The plurality of drawers 40 are capable of holding a plurality of small parts for environmental testing. The plurality of parts are placed in each drawer 40. A back of the drawer will be exposed to an inside atmosphere of an environmental chamber. The plurality of small parts are removed after the environmental testing has been performed. The drawer device 38 includes all of the sealing and attachment features of the sealing panel 22.

Figure 5:
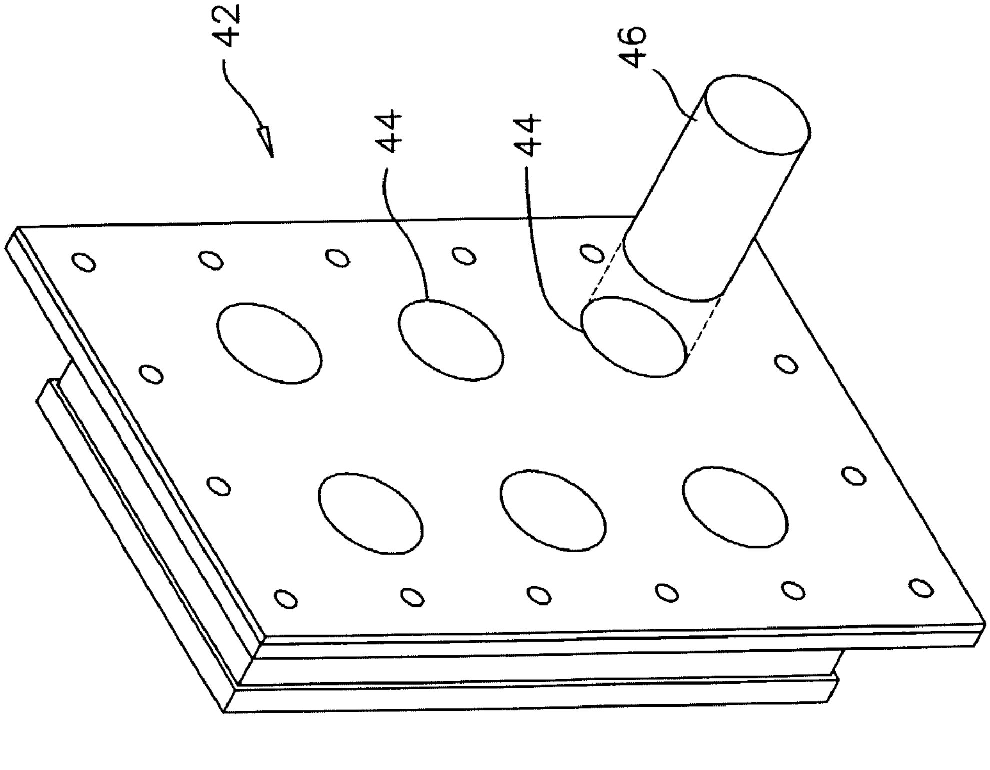
FIG. 5 is a perspective view of a wire access device for insertion into a universal access port of a conditioning enclosure in accordance with the present invention.

FIG. 5 discloses a wire device 42. A plurality of through passages 44 are formed through the wire device 42. Each through passage 44 is sized to firmly receive a single sealing insert 46. Each sealing insert 46 is preferably fabricated from foam, but other materials may also be used. Each sealing insert 46 is capable of sealing around wires or other lines that need to be run through the wall 102 of the conditioning enclosure 100. A round through passage 44 is disclosed, but the through passage may also have other shapes. The wire device 42 includes all of the sealing and attachment features of the sealing panel 22.

Figure 6A:
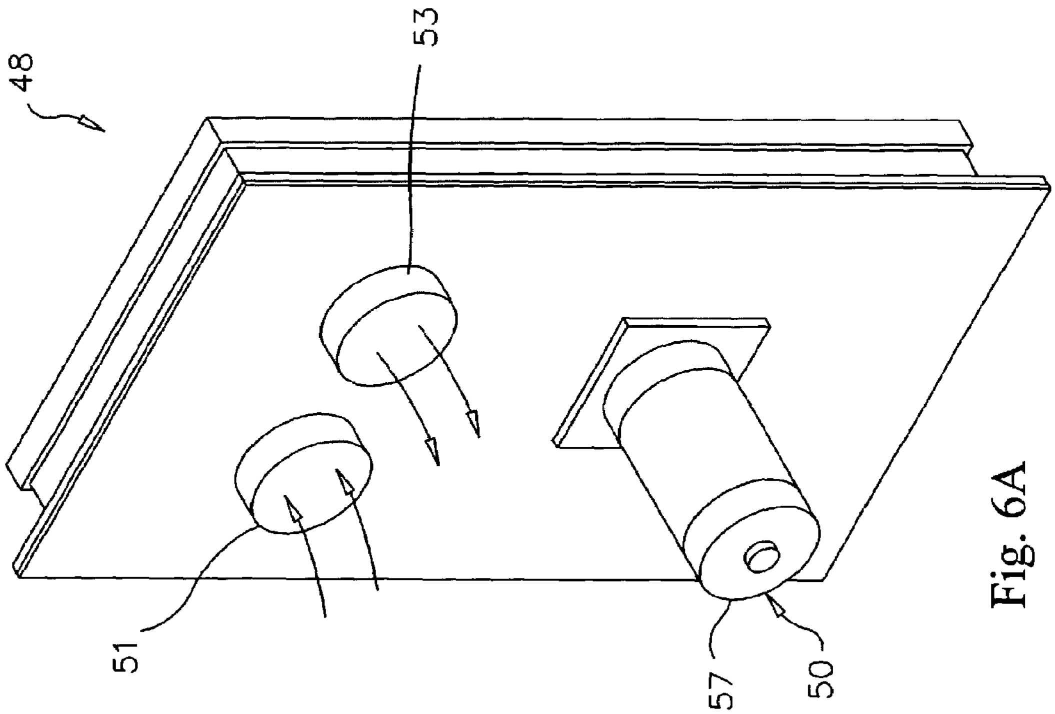
FIG. 6a is an exterior perspective view of a blower device for insertion into a universal access port of a conditioning enclosure in accordance with the present invention.
Figure 6:
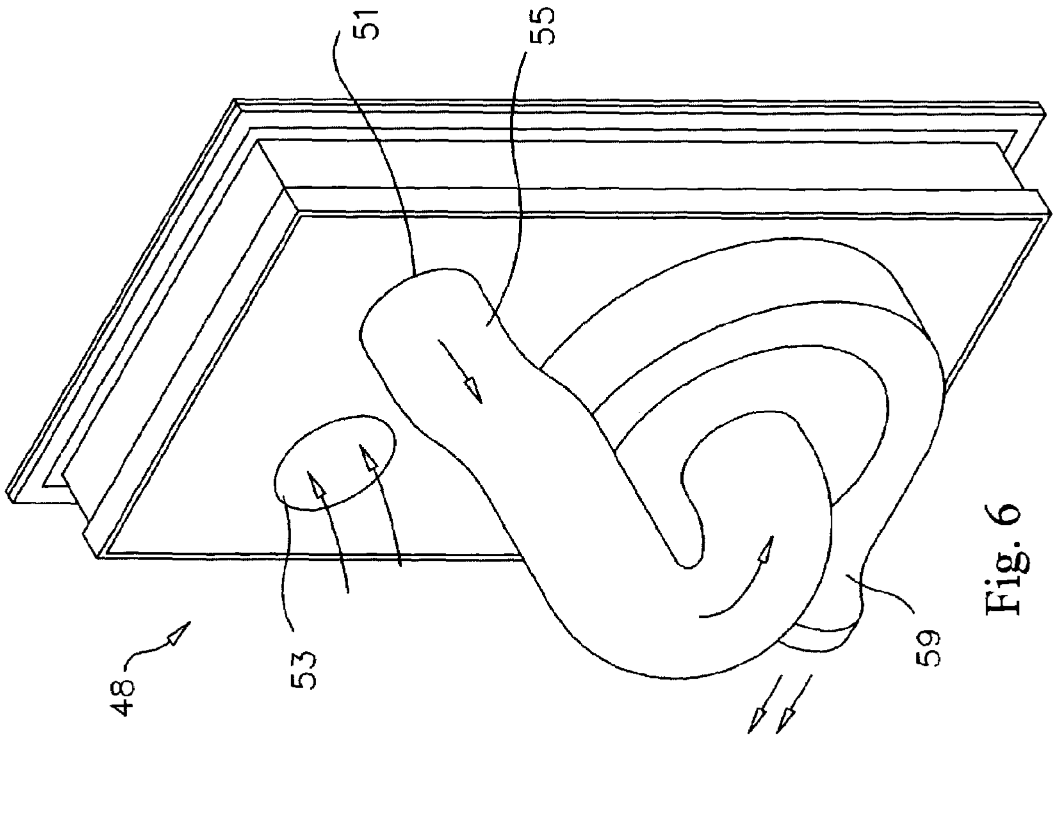
FIG. 6 is an interior perspective view of a blower device for insertion into a universal access port of a conditioning enclosure in accordance with the present invention.

FIGS. 6 and 6a disclose a blower device 48. The blower device 48 includes an air blower 50, an input port 51, an output port 53, and an input duct 55. The air blower 50 includes a motor 57 and an air impeller 59. An input duct (not shown) is preferably connected between a source of conditioned air and the input port 51. An output duct (not shown) is preferably connected between the source of conditioned air and the output port 53. The motor 57 turns a fan inside the air impeller 59 to draw air from the input port 51 through the input duct 55 to propelled conditioned air substantially perpendicular to the output port 53. The blower device 48 includes all of the sealing and attachment features of the sealing panel 22.

Figure 7:
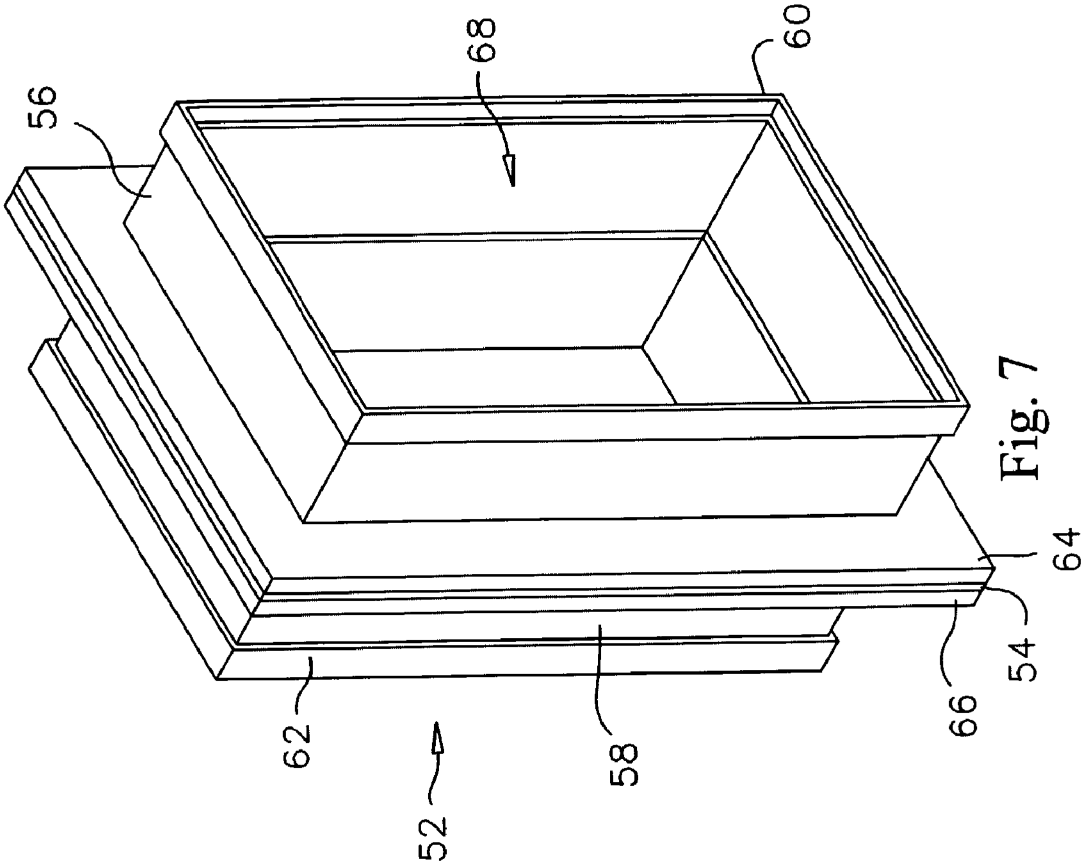
FIG. 7 is a perspective view of a junction device for insertion into universal access ports of two environmental test chambers in accordance with the present invention.

FIG. 7 discloses a junction device 52. The junction port device 52 includes a mounting plate 54, a first insulated insert 56, a second insulated insert 58, a first panel perimeter sealing ridge 60, a second perimeter panel sealing ridge 62, a first panel perimeter sealing gasket 64, and a second panel perimeter sealing ridge 66. The first insulated insert 56 extends from a first side of the mounting plate 54 and the second insulated insert 58 extends from a second side of the mounting plate 54. The first panel perimeter sealing ridge 60 is attached to a perimeter of the first insulated insert 56 and the second panel perimeter sealing ridge 62 is attached to a perimeter of the second insulated insert 58. The first panel perimeter sealing gasket 64 is attached to the first side of the mounting plate 54 and the second panel perimeter sealing gasket 66 is attached to the second side of the mounting plate 54. A through passage 68 is formed through the first insulated insert 56, the mounting plate 54 and the second insulated insert 58.

Figure 8:
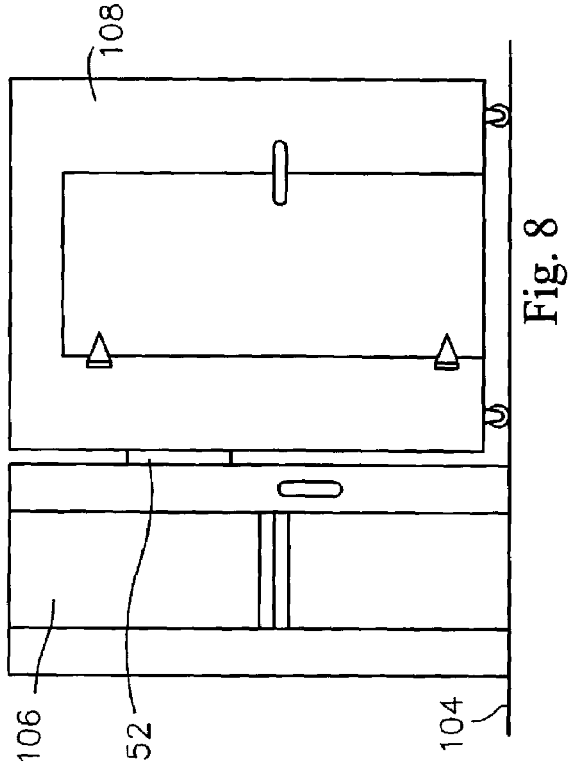
FIG. 8 is a front view of a first conditioning enclosure connected to a roll-up, walk-in conditioning chamber with a junction device in accordance with the present invention.

With reference to FIG. 8, the junction device 52 is used to connect a first conditioning enclosure 106 to a roll-up, walk-in conditioning enclosure 108. The first insulated insert 56 of the junction device 52 is inserted into a universal access port of the first conditioning enclosure 106 and a second insulated insert 58 of the junction device 52 is inserted into a universal access port of the roll-up, walk-in conditioning enclosure 108. The conditioning enclosures are pushed together to retain the junction device 52.

Figure 9:
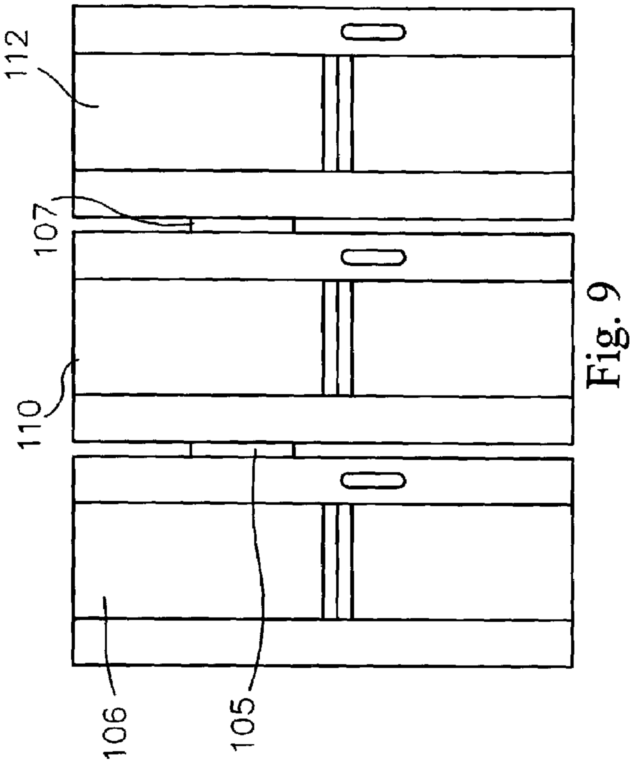
FIG. 9 is a front view of three conditioning enclosures connected together with two junction devices in accordance with the present invention.

With reference to FIG. 9, three conditioning enclosures are connected in series with two junction devices. The first conditioning enclosure 106 is connected to one side of a second conditioning enclosure 110 with a first junction device 105 and a third conditioning enclosure 112 is connected to the other side of the second conditioning enclosure 110 with a junction device 107. The second conditioning enclosure 110 includes at least two universal access ports.

Figure 11:
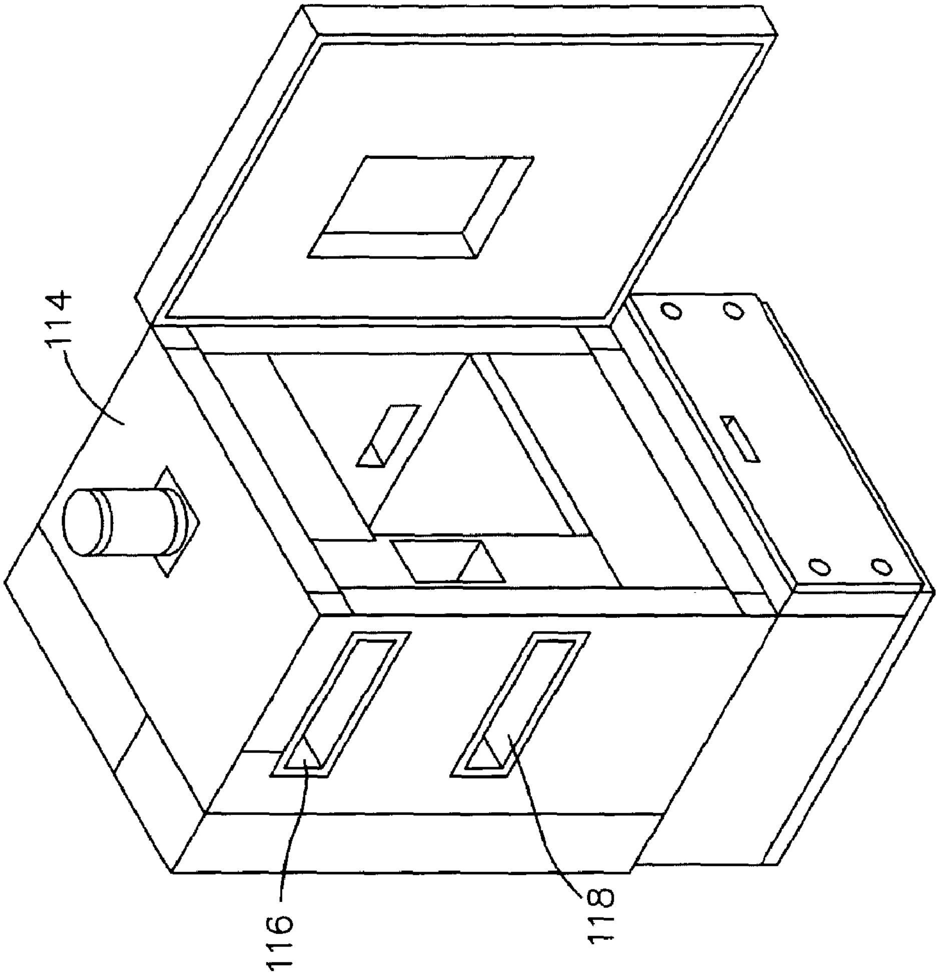
FIG. 11 is a perspective view of a conditioning enclosure with two dampers.
Figure 10:
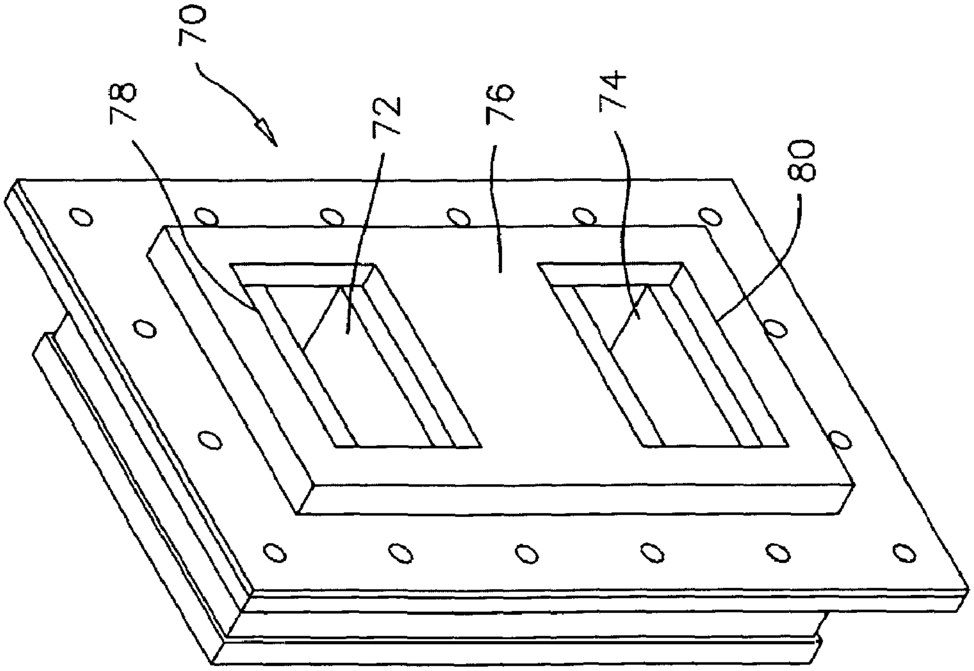
FIG. 10 is a perspective view of a damper device for insertion into a universal access port of one conditioning enclosure and mating with two dampers on another conditioning enclosure in accordance with the present invention.

FIG. 10 discloses a damper device 70. The damper device 70 includes a first damper through passage 72, a second damper through passage 74, and a sealing gasket 76. A first passage opening 78 is formed through the sealing gasket 76 to provide access to the first damper through passage 72. A second passage opening 80 is formed through the sealing gasket 76 to provide access to the first damper through passage 74. The damper device 70 includes all of the sealing and attachment features of the sealing panel 22. With reference to FIG. 11, a conditioning enclosure 114 is disclosed with a first damper 116 and a second damper 118 disposed on a side thereof. The damper device 70 is attached to the universal access port of a first conditioning enclosure (not shown). The conditioning enclosure 118 will be pushed against the sealing gasket 76, such that the first passage opening 78 is aligned with the first damper 116 and the second passage opening 80 is aligned with the second damper 118.

FIGS. 12-15 illustrate a carousel assembly 200 designed to be insertable into the opening 12 of the universal access port 10. The carousel assembly includes a frame assembly 202, a carousel 204, and a sealing door 206.

The frame assembly 202 has a rectangular shape and includes frame members 208 and a perimeter flange 210. The perimeter surface 212 of the frame assembly 202 is formed to sealingly fit into the opening 12 of the universal access port 10. In order to provide the desired seal in the opening 12, the frame members 208 can be provided with a perimeter sealing ridge, and a perimeter sealing gasket like that disclosed above in connection with FIGS. 2-3.

The carousel 204 includes an insulated panel 216 pivotally mounted to the frame assembly 202 and a plurality of shelves 218 mounted on opposing sides of the panel. The insulated panel 216 is pivoted for rotation (about pivot axis A, FIG. 15) relative to the frame between a first position (FIG. 12) and a second position (also represented by FIG. 12) 180 degrees rotated from the first position. FIG. 13 shows an intermediate position of the carousel between the first and second positions. When in either the first position or the second position, the panel 216 is aligned with the frame assembly 202 such that a perimeter edge 220 of the panel 216 is in facing relation to the interior face 222 of the frame members 208. Panel seals 224 are mounted on the inner face 222 of the frame members 208 to create a seal between the panel 216 and the frame assembly 202 when the panel 216 is in the first and second positions. In addition to or instead of the panels seals 224, additional panel seals (not shown) can be mounted on the perimeter edge 220 of the panel 216 to create a seal between panel 216 and the frame assembly 202. Movement of the panel 216 between the first and second positions can be done manually or by a motorized system, such as an electric motor (not shown).

Figure 15:
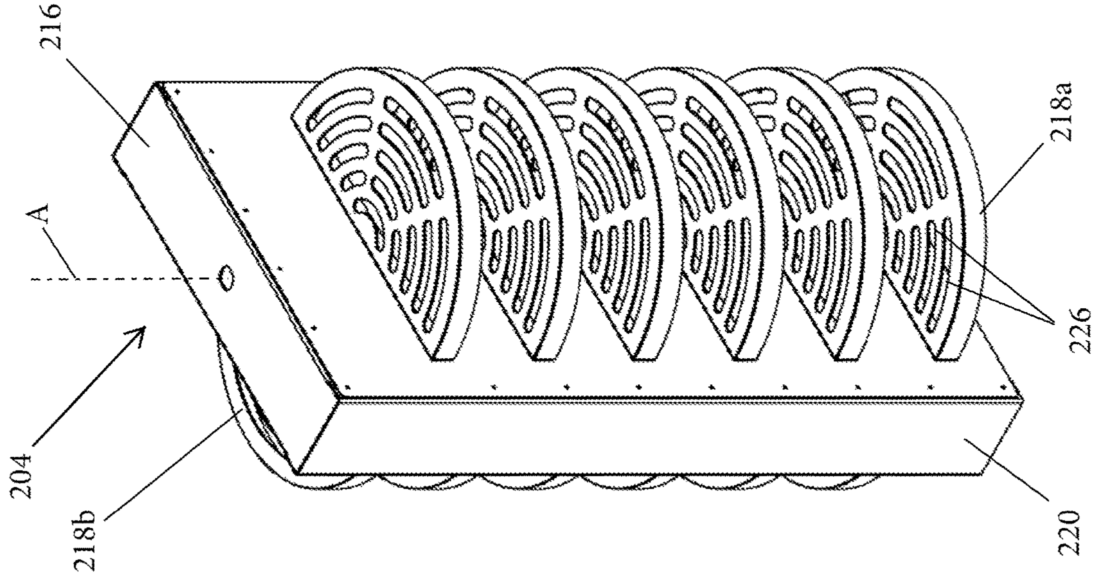
FIG. 15 is an enlarged perspective view of the carousel of FIG. 14.
Figure 14:
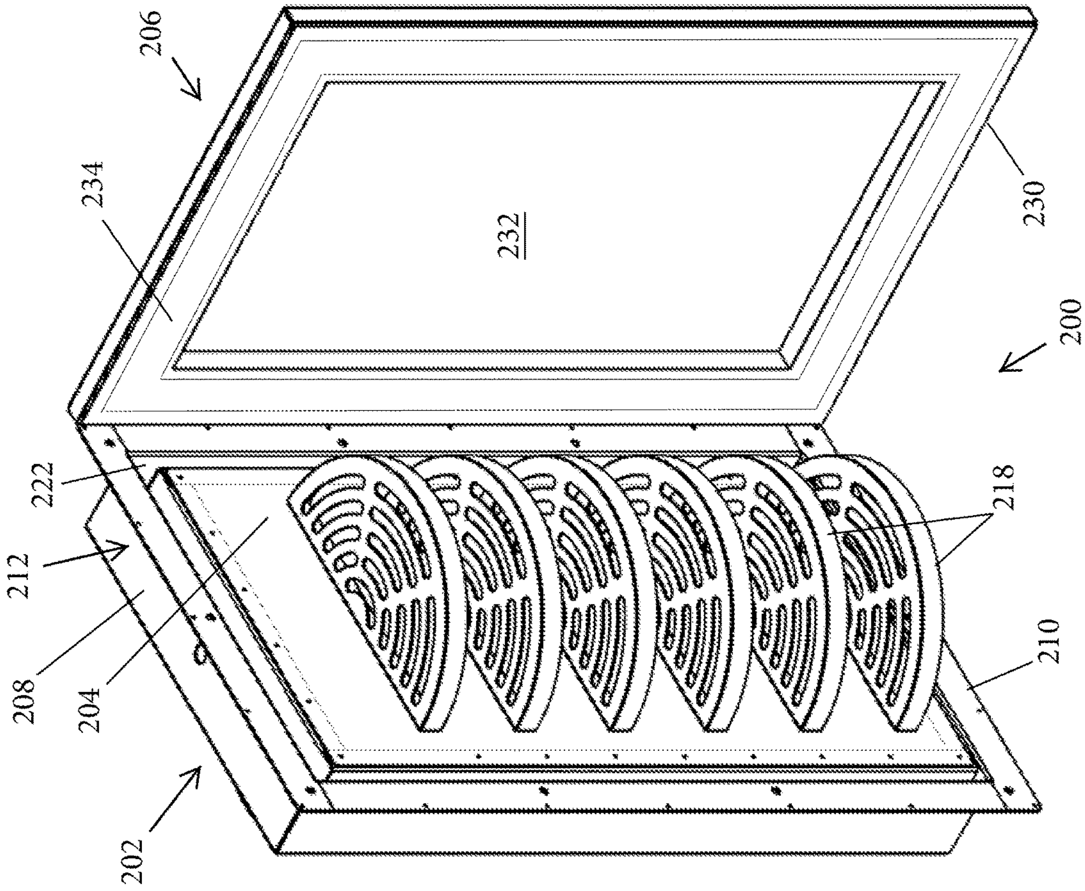
FIG. 14 is an enlarged perspective view of the carousel assembly of FIG. 12 including a frame and a carousel.

The shelves 218 are designed to support test specimens in the test chamber. Referring to FIG. 15, the shelves include a plurality of first shelves **218*a* mounted on a first side of the panel 216 and a plurality of second shelves 218*b* mounted on a second side of the panel 216. The illustrated shelves 218 have an arcuate or half circle shape to provide clearance relative to the frame assembly 202 when moving the panel 216 between the first and second positions. The illustrated shelves 218 also have openings 226** to facilitate the vertical flow of fluid (e.g., heating or cooling gases) for heating or cooling samples placed on the shelves.

The sealing door 206 is hinged to the frame assembly 202 and is pivotable between an open position (FIG. 13) and a close position (FIG. 12). The sealing door 206 includes a door frame 230 having a central opening 232 sized so that the shelves 218 on one side of the panel 216 will protrude through the central opening 232 when the sealing door 206 is in the closed position and the panel 216 is in either of the first and second positions. By virtue of this arrangement, the sealing door 206 will inhibit rotation of the panel 216 from the first or second positions. The sealing door 206 further includes a door seal 234 that provides a seal between an inner face of the sealing door 206 and each of the panel 216 and perimeter flange 210 when the sealing door 206 is in the closed position, thus sealing the gap between the panel 216 and the frame assembly 202. In addition to or instead of the door seal 234, door seals can be mounted on the faces of the panel 216 and flange 210 to create the seal with the sealing door 206. With this arrangement and positioning of the panel 216 and sealing door 206, samples can be loaded onto the shelves 218 outside the enclosure 100 when the sealing door 206 is in the closed position and the door seal 234 provides a seal between the panel 216 and frame members 208. The sealing door 206 can be pivoted to the open position to permit rotation of the panel 216 between the first and second positions.

In operation, the panel 216 is initially positioned in the first position and the sealing door 206 is in the closed position such that the first shelves **218*a* protrude through the central opening 232 of the sealing door 206 and the door seal 234 and panel seals 224 create a seal between the panel 216 and the frame assembly 202. The conditioning enclosure 100 can then be activated to move toward the desired environmental conditions inside the enclosure 100. While the enclosure 100 is moving toward the desired environmental conditions, first samples (not shown) can be loaded onto the first shelves 218*a*. After the desired environmental conditions exist inside the enclosure, the sealing door 206 can be moved to the open position and the panel 216 can be rotated to the second position such that the first shelves 218*a* and first samples are inside the enclosure 100. The sealing door 206 is then moved back to the closed position to seal the enclosure 100. In this position, the second shelves 218*b* will protrude through the central opening 232 of the sealing door 206 in a position to load second samples (not shown) onto the second shelves 218*b* while the first samples are undergoing testing inside the enclosure 100**.

When testing on the first samples inside the enclosure 100 is complete, the sealing door 206 can again be moved to the open position and the panel 216 can be rotated back to the first position such that the second shelves **218*b* and second samples are inside the enclosure 100 and the first shelves 218*a* and first samples are outside the enclosure 100. The sealing door 206 is then immediately moved back to the closed position to seal the enclosure 100. In this position, the first shelves 218*a* will protrude through the central opening 232 of the sealing door 206 in a position to unload the first samples from the first shelves 218*a* while the second samples are undergoing testing inside the enclosure 100**.

This process can continue by loading third samples onto the first shelves 218*a* and repeating the above process.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention. In this regard, the carousel may have more than two positions, and the amount of rotation could be angles other than 180 degrees. For example, the carousel could be divided into three segments that each account for 120 degrees of the carousel circumference. Such an embodiment could be designed such that two of the three segments are inside the conditioning enclosure when the other segment is outside the conditioning enclosure for loading. Alternatively, such an embodiment could be designed such that one of the three segments is inside the conditioning enclosure when the other two segments are outside the conditioning enclosure for loading.

What is clamed is:

1. A method of conducting environmental testing on a first test specimen and a second test specimen in a conditioning enclosure defining a conditioning space and having an access port, the method comprising the steps of:

providing a carousel assembly having a frame dimensioned to fit into the access port, and a panel pivotally coupled to the frame, the panel defining a first specimen location and a second specimen location;

inserting the carousel assembly into the access port;

loading the first test specimen to the first specimen location while the first specimen location is outside the conditioning space;

rotating the panel a first time until the first specimen is inside the conditioning space while simultaneously positioning the second specimen location outside the conditioning space;

performing a first test on the first specimen while the first specimen is inside the conditioning space and while the second specimen location is outside the conditioning space;

loading the second test specimen to the second specimen location while the second specimen location is outside the conditioning space and also while the first specimen location is inside the conditioning space;

rotating the panel a second time until the second specimen is inside the conditioning space while simultaneously positioning the first specimen outside the conditioning space; and after rotating the panel a second time, performing a second test on the second specimen.

2. A method of conducting environmental testing as claimed in claim 1, wherein the first specimen location is defined by a first shelf mounted on a first side of the panel and the second specimen location is defined by a second shelf mounted on a second side of the panel.

3. A method of conducting environmental testing as claimed in claim 2, wherein the first shelf and the second shelf each comprise an opening to facilitate a flow of fluid for heating or cooling samples placed on the shelves.

4. A method of conducting environmental testing as claimed in claim 2, wherein the first side of the panel is substantially opposed to the second side of the panel.

5. A method of conducting environmental testing as claimed in claim 1, wherein rotating the panel a first time comprises rotating the panel about 180 degrees.

6. A method of conducting environmental testing as claimed in claim 1, wherein the first test and the second test are similar.

7. A method of conducting environmental testing as claimed in claim 1, wherein before rotating the panel a first time the method further includes moving a sealing door from a closed position that blocks rotation of the panel to an open position that permits rotation of the panel.

8. A method of conducting environmental testing as claimed in claim 7, wherein after rotating the panel a first time the method further includes moving the sealing door from the open position to the closed position to provide a seal between the frame and the panel.

9. A method of conducting environmental testing as claimed in claim 8, wherein after moving the sealing door from the open position to the closed position the second specimen location is accessible from outside the conditioning enclosure.

10. A method of conducting environmental testing as claimed in claim 9, wherein the first specimen location is defined by a first shelf mounted on a first side of the panel and the second specimen location is defined by a second shelf mounted on a second side of the panel, wherein the first side of the panel is substantially opposed to the second side of the panel, and wherein after moving the sealing door from the open position to the closed position the second shelf extends through an opening in the sealing door.

11. A conditioning enclosure comprising:

a housing defining a conditioning space and including a front wall having an access port;

a carousel assembly comprising:

a frame removably positioned in the access port;

a panel pivotally coupled to the frame, the panel defining a first specimen location on a first side of the panel and a second specimen location on a second side of the panel opposite the first side, wherein the panel is pivotable between a first position, in which the first specimen location is inside the conditioning space and the second specimen location is outside the conditioning space, and a second position, in which the second specimen location is inside the conditioning space and the first specimen location is outside the conditioning space.

12. A conditioning enclosure as claimed in claim 11, wherein the panel is substantially aligned with the front wall of the housing when the panel is in first position and when the panel is in the second position.

13. A conditioning enclosure as claimed in claim 12, wherein the carousel assembly further includes a panel seal between the frame and the panel when the panel is in the first position and when the panel is in the second position.

14. A conditioning enclosure as claimed in claim 11, further comprising a sealing gasket between the frame and the front wall.

15. A conditioning enclosure as claimed in claim 11, wherein the carousel assembly further includes a first shelf defining the first specimen location and a second shelf defining the second specimen location.

16. A conditioning enclosure as claimed in claim 11, wherein the carousel assembly further comprises a sealing door mounted to the frame and movable between an open position that permits rotation of the panel and a closed position that blocks rotation of the panel.

17. A conditioning enclosure as claimed in claim 16, wherein the sealing door provides a seal between the frame and the panel when the sealing door is in the closed position.

18. A conditioning enclosure as claimed in claim 17, wherein one of the first specimen location and the second specimen location is accessible from outside the conditioning enclosure when the sealing door is in the closed position.

19. A conditioning enclosure as claimed in claim 18, wherein the first specimen location is defined by a first shelf mounted on a first side of the panel and the second specimen location is defined by a second shelf mounted on a second side of the panel, wherein the first side of the panel is substantially opposed to the second side of the panel, and wherein one of the first shelf and second shelf extends through an opening in the sealing door when the sealing door is in the closed position.

* * * * *